(12) United States Patent
Marcel et al.

(10) Patent No.: US 8,157,051 B2
(45) Date of Patent: Apr. 17, 2012

(54) MOULDED SOUNDPROOFING COMPONENT, AND MANUFACTURING METHOD THEREOF

(75) Inventors: Valérie Marcel, Brandeville (FR); Guillaume Deshayes, Tokyo (JP)

(73) Assignee: Faurecia Automotive Industrie, Nanterre (FR)

( * ) Notice: Subject to any disclaimer, the term of this patent is extended or adjusted under 35 U.S.C. 154(b) by 0 days.

(21) Appl. No.: 12/670,149

(22) PCT Filed: Jul. 25, 2008

(86) PCT No.: PCT/FR2008/051402
§ 371 (c)(1),
(2), (4) Date: Apr. 21, 2010

(87) PCT Pub. No.: WO2009/016321
PCT Pub. Date: Feb. 5, 2009

(65) Prior Publication Data
US 2010/0200327 A1    Aug. 12, 2010

(30) Foreign Application Priority Data
Jul. 25, 2007  (FR) ..................................... 07 05430

(51) Int. Cl.
*E04B 1/82* (2006.01)
(52) U.S. Cl. ....................... 181/290; 181/286
(58) Field of Classification Search ................. 181/284, 181/286, 288, 290, 294, 296
See application file for complete search history.

(56) References Cited

U.S. PATENT DOCUMENTS

| 4,131,664 | A | | 12/1978 | Flowers et al. | |
|---|---|---|---|---|---|
| 5,053,271 | A | | 10/1991 | Mori et al. | |
| 5,094,318 | A | * | 3/1992 | Maeda et al. | 181/290 |
| 6,145,617 | A | | 11/2000 | Alts | |
| 6,631,785 | B2 | * | 10/2003 | Khambete et al. | 181/290 |
| 6,789,646 | B2 | * | 9/2004 | Wang et al. | 181/293 |
| RE39,010 | E | * | 3/2006 | Gish et al. | 181/290 |
| 2001/0015222 | A1 | | 8/2001 | Lewit et al. | |
| 2005/0103564 | A1 | * | 5/2005 | Duval et al. | 181/204 |
| 2005/0126848 | A1 | * | 6/2005 | Siavoshai et al. | 181/207 |

FOREIGN PATENT DOCUMENTS
EP    1 702 883 A1    9/2006

OTHER PUBLICATIONS
International Search Report, dated Mar. 23, 2009, from corresponding PCT application.

* cited by examiner

*Primary Examiner* — Jeremy Luks
(74) *Attorney, Agent, or Firm* — Young & Thompson

(57) ABSTRACT

This method includes the placing of the first porous layer (1) onto one part of a wall of a mold cavity having the shape desired by the soundproofing component, the first layer (1) not occupying the entire cavity, and the injection of a foaming polymer composition into the cavity of the mold to form the second open-cell porous layer (3). The two steps of placing the practically airtight intermediate layer (2) onto the first porous layer (1) and of injecting a polymer composition in order to form the second porous layer (3) are carried out simultaneously in a single step of injecting the foaming polymer composition.

20 Claims, 5 Drawing Sheets

MOULDED SOUNDPROOFING COMPONENT, AND MANUFACTURING METHOD THEREOF

The present invention relates to a method for producing a moulded sound-proofing component and the component obtained by the implementation thereof.

Sound-proofing components are arranged at a number of locations of substantially closed spaces, such as the passenger compartment of a motor vehicle. Such components are arranged, for example, on the floor or the bulkhead.

The large number of known sound-proofing devices which are intended for motor vehicles include the one which is described in document U.S. Pat. No. 6,145,617. It comprises two porous layers which are positioned on a support with a layer of air preferably being interposed. The two porous layers must communicate with passage of air being allowed. That sound-proofing device has the advantage of being light although its acoustic properties are not always sufficient. In order to construct such a system, it would be possible to envisage injecting, at a first porous layer, a polymer foaming composition in order to form the second porous layer having open cells. However, such an operation would form a fluid-tight zone between the two layers, contrary to the operating principle of this device, so that it would lose the majority of its sound-proofing properties.

Another older device, which is described in document U.S. Pat. No. 4,131,664, constitutes a sound-proofing panel which comprises a membrane or an impermeable film which is arranged between two layers of felt having different densities. In that system, the membrane or film prevents any passage of air between the two layers.

The invention relates to the production of sound-proofing components of the second general type described in the document U.S. Pat. No. 4,131,664, that is to say, comprising an intermediate layer which is air-tight.

The disadvantage of the sound-proofing components of that second general type is that they are relatively expensive. In particular, in order to construct such a component, it is necessary, starting from a first porous layer, to carry out a first operation of providing a relatively impermeable intermediate layer, then a second operation of providing the other porous layer.

An object of the invention is to considerably reduce the production cost of such moulded sound-proofing components.

According to the invention, the intermediate layer which is relatively impermeable to air and one of the porous sound-proofing layers are constructed simultaneously in a single injection step so that the cost of the product constructed may be reduced.

In greater detail, according to the invention, at least at its surface directed towards the side which must co-operate with other layers, a first porous layer has open porosity. The intermediate layer and the other porous layer are subsequently constructed in a single injection step in such a manner that a portion of the fluid composition injected penetrates into the porous structure of the first layer over a given depth. During the foaming of the fluid composition injected in order to form the second porous layer, the material contained in the porosity of the first porous layer practically cannot form any foam so that there remains, over the penetration depth in the first layer, an intermediate densified layer which is constituted by the materials of the two porous layers.

In this manner, the invention relates to a method of producing a moulded sound-proofing component of the type which comprises a first porous layer and a second porous layer having open cells and, between those two porous layers, an intermediate layer which is practically air-tight, the method being of the type which comprises the provision of the first porous layer on a wall portion of a mould cavity having the shape desired for the sound-proofing component, the first layer not occupying the whole cavity, the provision of the intermediate layer which is practically air-tight on the first porous layer, the first layer not occupying the whole cavity, and the injection of a polymer foaming composition into the cavity of the mould in order to form the second porous layer having open cells. According to the invention, the two steps of providing the practically air-tight intermediate layer on the first porous layer and injecting a polymer composition in order to form the second porous layer are carried out simultaneously in a single injection step for the polymer foaming composition, in contact with the first layer, under such conditions that the polymer composition forms, with the material of the first layer, the practically air-tight intermediate layer which is denser than each of the first and second porous layers.

The injection is carried out under controlled flow, temperature and pressure conditions so that the intermediate layer has the desired thickness, taking into account the properties of resistance to passage of air, porosity, density, structure, surface, etc., of the first porous layer.

In this manner, the method may comprise the definition of a desired thickness of the intermediate layer, then control of the flow, temperature and pressure during injection so that the intermediate layer has the desired thickness.

When the injected polymer composition is formed by mixing at least two components, the injected composition is produced under corresponding conditions for the two components of the composition such that the intermediate layer has the desired thickness.

The provision of the first layer preferably comprises the positioning of a layer of a porous material on a mould wall, the porous material being selected from a felt and a foam. This may be split, injected, extruded, etc. According to an improvement, in which the porous material is provided with a layer having poor permeability, the step of providing the first layer comprises positioning the layer of the porous material in such a manner that the layer having poor permeability is positioned against the wall of the mould.

The method preferably comprises a subsequent perforation step which is carried out at least at one side of the component and which affects at least a portion of the thickness of the component.

The method according to the invention advantageously comprises one or more of the following features:

- the thickness of the intermediate layer after injection is between 10% and 20% of the thickness of the first porous layer;
- the intermediate layer has a mass per unit area of between 100 g/m$^2$ and 1000 g/m$^2$;
- the first porous layer has at least one porous layer having resistance to passage of air of between 200 N·m$^{-3}$·s and 3500 N·m$^{-3}$·s;
- the layer having greater resistance to passage of air has a resistance to passage of air of between 200 N·m$^{-3}$·s and 2000 N·m$^{-3}$·s.

The invention also relates to a method for producing a motor vehicle comprising a step of producing a moulded insulating compound in accordance with the method defined above and a step of providing the moulded insulating component obtained on the floor or bulkhead of the vehicle.

The invention also relates to a moulded sound-proofing component which is produced by carrying out the method of the preceding paragraphs, in which the intermediate layer is constituted only by the materials of the two layers. The thickness thereof is preferably determined by the depth of penetration of the material of the second layer into the porous structure of the material of the first layer.

The intermediate layer preferably has a thickness of at least 0.1 mm.

The material of the second layer is preferably a polyurethane.

Advantageously, the component according to the invention further comprises one or more of the following features:
- the thickness of the intermediate layer is between 10% and 20% of the thickness of the first porous layer;
- the intermediate layer has a mass per unit area of between 100 g/m² and 1000 g/m²;
- the first porous layer has at least one porous layer having resistance to passage of air of between 200 N·m⁻³·s and 3500 N·m⁻³·s;
- the first porous layer is provided with a porous layer whose external surface carries a layer having greater resistance to passage of air;
- the layer having greater resistance to passage of air has a resistance to passage of air of between 200 N·m⁻³·s and 2000 N·m⁻³·s;
- it comprises a decorative matting layer which is provided on the first porous layer, optionally with a fine fluid-tight film being interposed;
- the layer of matting is provided on the layer having greater resistance to passage of air.

The invention also relates to a motor vehicle comprising a floor and a bulkhead and a moulded insulating component, as defined above, provided on one of the floor or the bulkhead.

The invention has significant advantages for producing moulded sound-proofing components, both ones which are planar and ones of any shape obtained by moulding.

Firstly, the first porous sound-proofing layer may be of very different types (layer of foam, felt, nonwoven, etc.), and it may be produced beforehand and positioned in the mould. The important characteristic is that the face of the material of the first layer, which is directed towards the side at which the other layers have to be positioned, must be porous, that is to say, provided with recesses at least over the desired depth for the formation of the intermediate layer.

Since a single step allows the intermediate layer and the other porous layer to be produced, and since the nature of the material of that other layer may be selected from a number of fluid compositions for foaming plastics material, the scope of application of the invention is extremely wide.

The advantage of that great latitude for selecting the materials of the two porous layers is in addition to the advantage of low cost owing to the reduction in the number of production steps, and therefore the cost of the production installation.

Other features and advantages of the invention will be better understood from a reading of the following detailed description and examples, given with reference to the appended drawings, in which.

Figure 6:
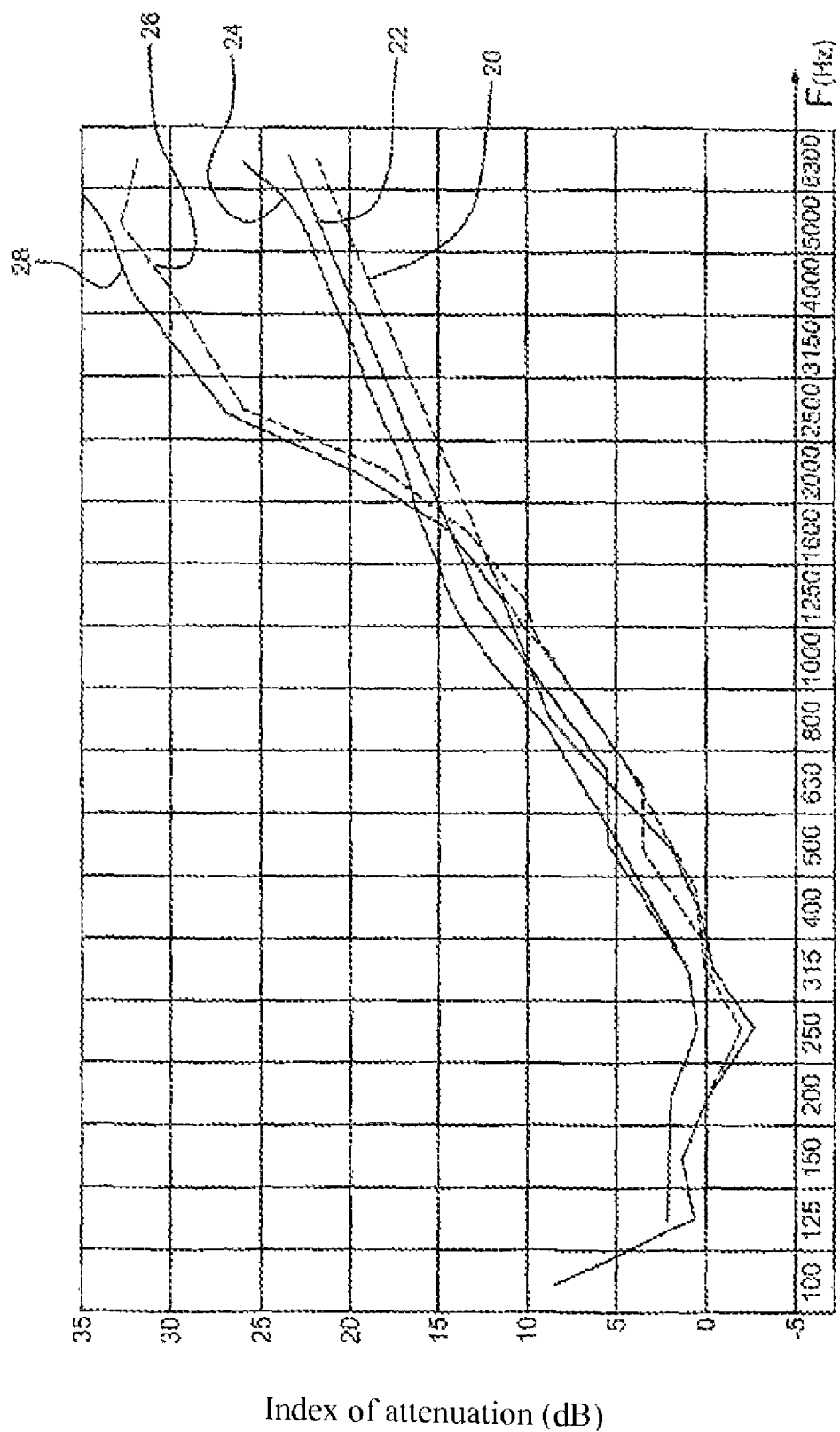
Figure 7:
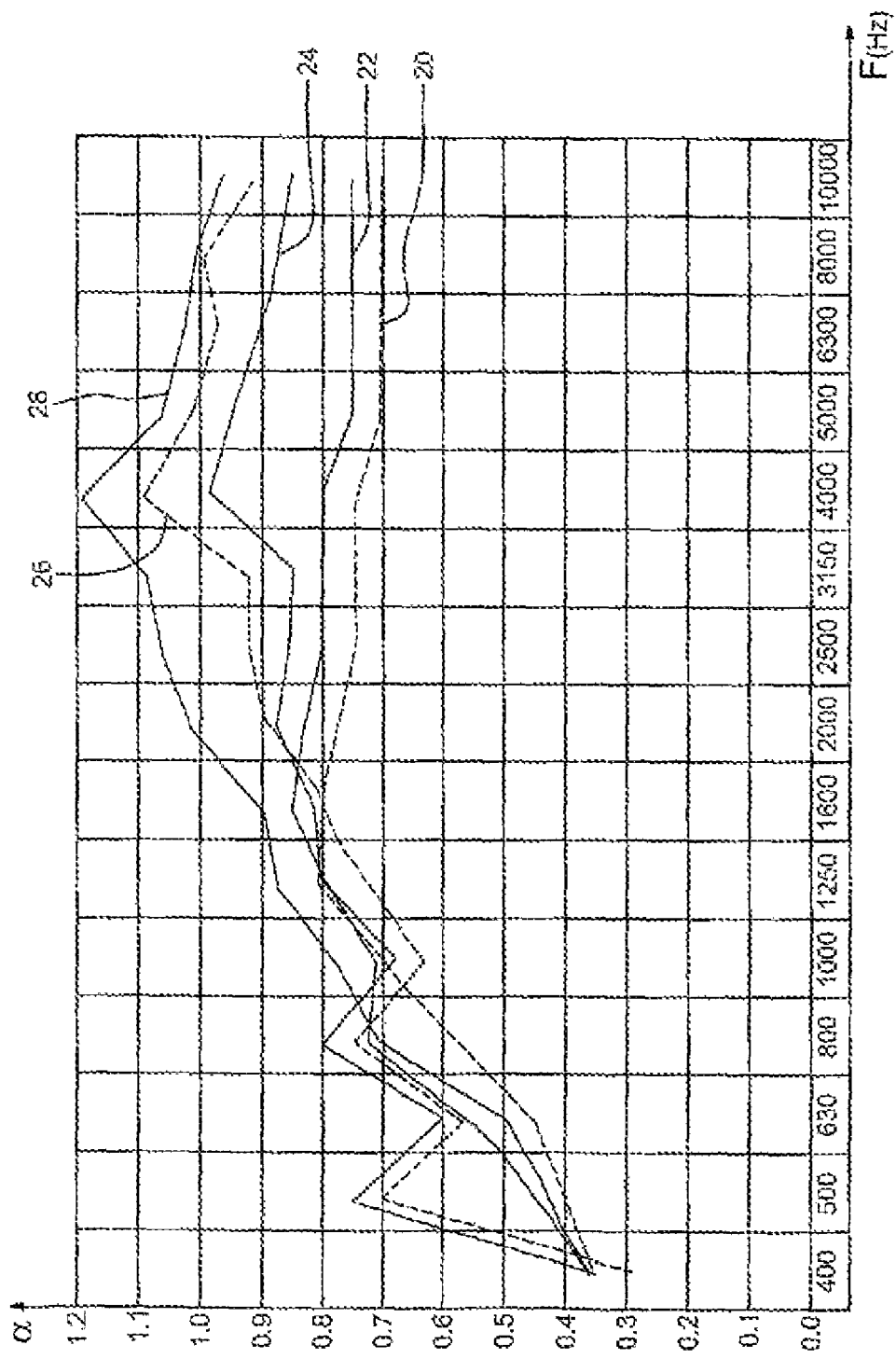

FIG. 6 is a graph illustrating the lines of the index of reduction in dB as a function of the frequency for two sound-proofing components according to the invention and for a sound-proofing component from the prior art; and FIG. 7 is a graph illustrating the lines of the absorption coefficient in a diffuse field as a function of the frequency for two sound-proofing components according to the invention and for a sound-proofing component from the prior art.

Figure 1:
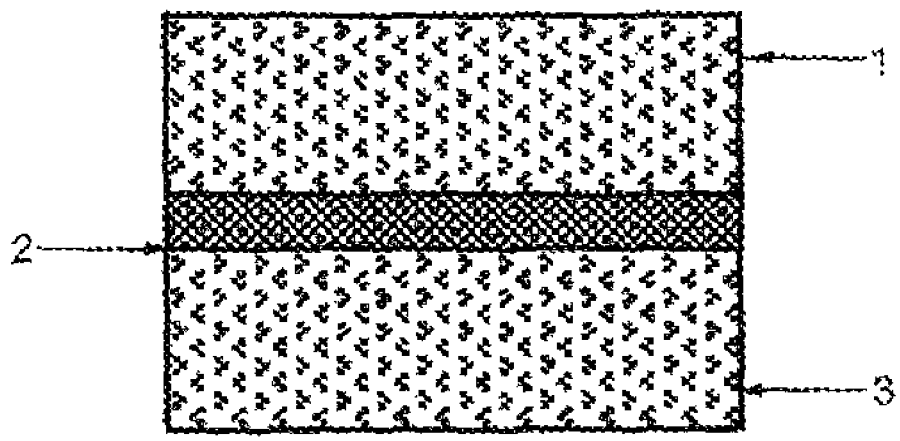
FIG. 1 is a partial view of an example of a sound-proofing component produced by the method according to the invention.
Figure 2:
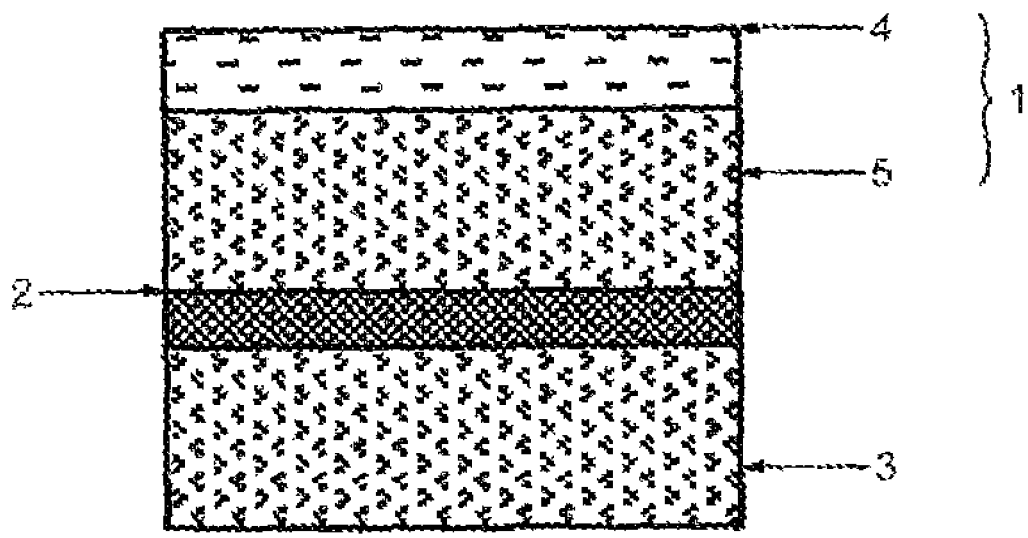
FIG. 2 is a partial view of another example of a sound-proofing component produced by the method according to the invention.

In FIGS. 1 and 2, the reference numeral 1 designates the first porous layer, either a simple layer as indicated in FIG. 1, or a complex layer as indicated in FIG. 2. In FIG. 2, the layer 1 comprises a porous layer 5 whose outer surface carries a layer 4 having greater resistance to passage of air. For example, the layer 5 may be a felt and the layer 4 may be a nonwoven.

The reference numeral 3 designates the second porous layer of foam formed by a fluid composition being injected and the reference numeral 2 designates the intermediate layer which is formed by the material of the fluid foaming composition which is trapped in the surface portion of the first porous layer 1.

Embodiments of two moulded sound-proofing components according to the invention will now be considered.

Example 1

In a first embodiment, a sheet of a felt of natural and/or synthetic fibres is cut from a roll of felt, in accordance with the peripheral configuration of the desired sound-proofing component.

That sheet of felt is intended to constitute the first sound-proofing layer of the component and it is arranged in an injection mould, on the wall of a first half-mould. The mould is then closed and a fluid foaming composition is injected into the cavity of the mould, between the sheet of felt and the other half-mould of the mould which delimits the mould cavity.

The conditions of pressure, temperature and flow of injection are established, taking into account the properties of resistance to passage of air, porosity, density, structure, surface, etc., of the first porous layer, in such a manner that the fluid composition injected penetrates by the desired depth via the accessible surface of the felt. For example, the fluid composition penetrates into the felt over a thickness of approximately 0.3 mm. Since the fluid composition contained in the surface layer of the felt does not have sufficient space for expansion, foaming is practically impossible in that region. In a variant, the second half-mould may slide in the first and may be spaced apart so that the foam is subjected to expansion and the fluid composition injected forms the foam of desired density.

When the layer of foam injected has become stabilised sufficiently, the mould is opened and the moulded component is removed. In accordance with the shape of the cavity of the mould, the component may be planar or of any desired configuration. It may be used in that state or it may be subjected to an additional operation, for example, perforation and/or finishing of the edges.

The intermediate layer which is constituted by the material of the injected composition trapped in a surface region of the felt and by the material of the felt and the layer of foam injected are thereby produced in a single mould, in a single operation. The product obtained may thus be finished.

It will be understood that the cost of the component obtained is thereby reduced in relation to that of the components which are obtained with known methods which comprise either formation of a layered component, then moulding to shape, or production by stacking the three layers in a mould, with at least two separate operations, one for providing the intermediate layer and the other for producing the second sound-proofing layer.

In a variant of this example, the first sheet of felt is replaced by a layer of foam of predetermined thickness. For example, that layer may have open porosity at one face and a skin at the other face thereof. Such a layer may be obtained by cutting, in the centre plane thereof, a layer of foam of double thickness.

Example 2

In a second example, unlike in the first example, the first layer is not formed by a felt, but instead is constituted by a layer of foam which is injected. That method has the advantage of allowing the production of a sound-proofing component whose first porous layer has a variable thickness which is adapted to the specific function of the component.

In the last example, the materials of the first and second porous sound-proofing layer must be different, if not owing to their nature then at least owing to their sound-proofing properties, for example, their properties of resistance to passage of air, porosity, density, structure, surface, etc.

Those properties are such that the intermediate layer is practically fluid-tight. To that end, that intermediate layer preferably has a thickness of at least 0.1 mm.

The sound-proofing components illustrated in FIGS. 1 and 2 are advantageously intended to be provided on a metal sheet of the bulkhead of a motor vehicle.

The first porous layer 1 in the case of FIG. 1 or the porous layer 5 in the case of FIG. 2 is formed, for example, by an absorbent felt, such as a felt which advantageously comprises a high percentage of microfibres, such as, for example, more than 50%, advantageously more than 80% of microfibres.

The term "felt" is intended according to the present invention to refer to a mixture of base fibres and binder. The fibres may be new and/or recycled fibres which are natural or synthetic, of one type or several types. Examples of natural fibres which can be used are flax, cotton, hemp, bamboo, etc. Examples of synthetic fibres which can be used are glass fibres, Kevlar, polyamide, acrylic, polyester, polypropylene.

The binder is, for example, a resin or binding fibres which have a melting point which is lower than that of the base fibres to be bound. Examples of resins are epoxy resins, or phenolic resins. Examples of binding fibres are polypropylene, polyethylene, polyamide, polyester, or bi-component polyesters.

The term "microfibres" is intended to refer to fibres having sizes of less than 0.9 dtex, advantageously less than 0.7 dtex.

In a variant, the felt of the porous layer 1 or porous layer 5 contains recycled material from waste products of internal or external origin, for example, offcuts from pieces of automotive equipment, production rejects or pieces of a vehicle past the useful life thereof. Those waste products are, for example, ground and incorporated in the felt in the form of pieces of divided material which are constituted by agglomerations, flocks or particles. The components of the waste products may be separated before or during the grinding operation.

In the variant of porous layer 1 or porous layer 5 of foam, the foam has open cells. It is produced, for example, from polyurethane. The foam is injected or split.

In a variant, the injected or split foam also contains recycled material, as defined above, or a mineral charge, or a polyalcohol such as "bio-polyalcohol".

In a variant, the porous layer 1 or porous layer 5 is constructed on the basis of a foam having open cells with a high level of tortuousness, as described in the application WO2007/006950 by the same applicant.

Such a foam has a tortuousness greater than 1.4 and advantageously between 1.4 and 3.

That tortuousness is measured by establishing the gradient of the line representing the variation of the square of the refraction index for the acoustic wavelength used as a function of the inverse of the square root of the frequency.

The thickness of the first porous layer 1 or porous layer 5 is, for example, between 4 mm and 12 mm, for example, of 8 mm.

In the case of a porous layer 1 or a porous layer 5 of felt, the mass per unit area of the porous layer 1 or porous layer 5 is advantageously between 200 $g/m^2$ and 2000 $g/m^2$, for example, of 1200 $g/m^2$. In the case of a porous layer 1 or a porous layer 5 of foam, the density of the layer is advantageously between 10 $kg/m^3$ and 80 $kg/m^3$, for example, being approximately 70 $kg/m^3$.

The porosity of that layer 1 or layer 5 is selected so that the resistance to passage of air of that layer is, for example, between 200 $N \cdot m^{-3} \cdot s$ and 3500 $N \cdot m^{-3} \cdot s$, for example, of 2000 $N \cdot m^{-3} \cdot s$.

The resistance and the resistivity to passage of air are measured by the method described in the thesis "Mesures des paramètres caractérisant un milieu poreux. Etude expérimentale du comportement acoustique des mousses aux basses fréquences.", (Measurements of the parameters characterising a porous medium. Experimental study of the acoustic behaviour of foams at low frequencies), Michel HENRY, attended on 3 Oct. 1997 at the French University of Mans.

The intermediate layer 2 is advantageously air-tight. As has been seen above, it is produced by an admixture between the porous material contained in the first porous layer 1 or porous layer 5 and the fluid foaming composition which is injected to produce the second porous layer 3 which blocks in a fluid-tight manner the pores and/or gaps defined by the porous material.

The thickness of the intermediate layer 2 is advantageously less than 20% of the thickness of the porous layer 1 or porous layer 5 and is advantageously greater than 10% of the thickness of the porous layer 1 or porous layer 5.

It is advantageously greater than 0.1 mm and between 0.5 mm and 3 mm, advantageously of approximately 1.5 mm.

That thickness is controlled in accordance with the density of the porous material constituting the first porous layer, during the production method of the component, with the injection parameters of the foam being modified, such as the injection flow rate and the injection pressure. The higher the density of the porous material, the less the fluid foaming composition which is injected to produce the second porous layer 3 penetrates into the porous material.

The density of the intermediate layer 2 is greater than the density of the first porous layer 1 in the case of FIG. 1 and the density of the porous layer 5 in the case of FIG. 2. It is also greater than the density of the second porous layer 3.

The mass per unit area of the intermediate layer is advantageously between 100 $g/m^2$ and 1000 $g/m^2$, advantageously substantially of 320 $g/m^2$.

In order to ensure good acoustic properties, the second porous layer 3 is produced, as has been seen above, on the basis of an injected visco-elastic foam which has acoustic insulation properties.

The foam has open cells. It is produced, for example, from polyurethane. In a variant, the foam contains recycled material or a mineral charge or a polyalcohol such as "biopolyalcohol".

The term "recycled material" is intended to refer to a material from waste products of internal or external origin, for example, offcuts from pieces of motor vehicle equipment, production rejects or pieces of a vehicle past their useful life. Those waste products are, for example, ground and incorporated in the foam in the form of pieces of divided material, constituted by agglomerations, flocks or particles. The components of the waste products can be separated before or during the grinding operation.

The density of the layer 3 is between 30 kg/m$^3$ and 70 kg/m$^3$, and in particular approximately 50 kg/m$^3$.

The layer 3 is porous and has a porosity which is adapted to provide resistivity to passage of air which is advantageously between 10000 Nm$^{-4}$·s and 90000 Nm$^{-4}$·s, preferably of 30000 Nm$^{-4}$·s.

In order to have resilient properties, the second porous layer 3 advantageously has an elasticity modulus of between 100 Pa and 100000 Pa, in particular approximately of 40000 Pa.

In the example of FIG. 2, the resistive layer 4 is advantageously produced on the basis of a resistive nonwoven or a material which has defined resistance to passage of air, such as a felt having a low basis weight, a textile, etc.

It has a thickness less than that of the porous layer 5 and that of the second porous layer 3.

The mass per unit area thereof is between 20 g/m$^2$ and 200 g/m$^2$.

The resistive layer 4 is porous in order to have resistance to passage of air which is between 200 N·m$^{-3}$·s and 2000 N·m$^{-3}$·s, advantageously of 500 N·m$^{-3}$·s approximately.

The resistive layer 4 is fixed to the layer 5 by mechanical fixing, such as adhesive bonding, or laminating or chemical fixing.

Figure 3:
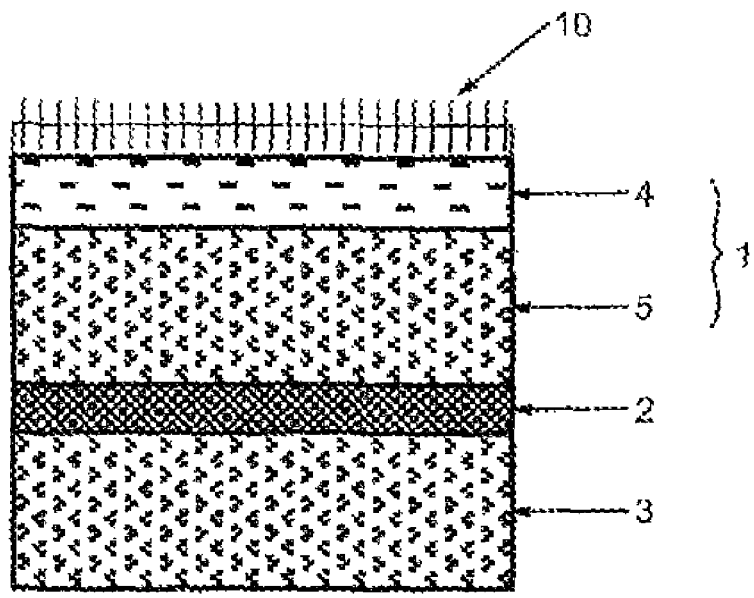
FIG. 3 is a view similar to FIG. 1 of a third sound-proofing component according to the invention capable of being applied to a floor of a motor vehicle.

A third moulded sound-proofing component which is intended to be provided on a metal sheet of a motor vehicle floor in order to form a matting is illustrated in FIG. 3.

That third component differs from the second component illustrated in FIG. 2 only owing to the presence of a decorative layer 10 which is positioned above the resistive layer 4. That decorative layer is produced on the basis of matting, for example, on the basis of Dilour or a flat or tufted needled matting.

The layer 10 has a mass per unit area of between 200 g/m$^2$ and 700 g/m$^2$, advantageously of 550 g/m$^2$.

Figure 4:
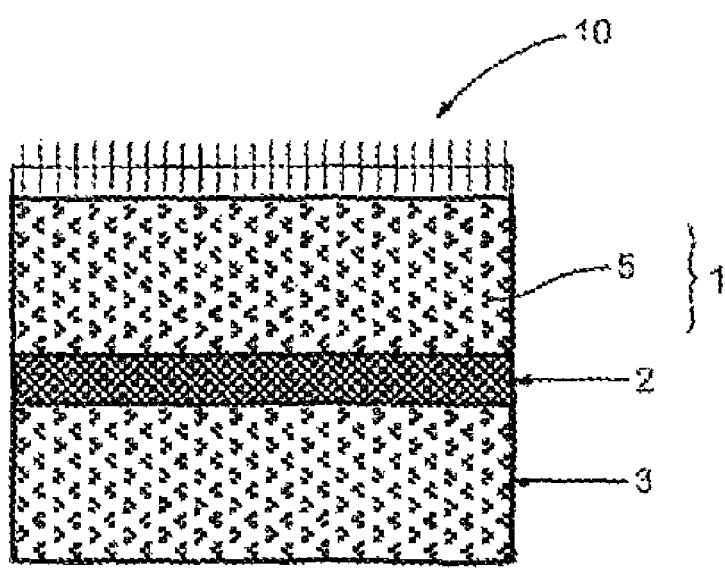
FIG. 4 is a view similar to FIG. 1 of a fourth sound-proofing component according to the invention capable of being applied to a floor of a motor vehicle.

A fourth moulded sound-proofing component which is intended to be fixed to a metal sheet of a motor vehicle floor in order to form a matting is illustrated in FIG. 4.

That component differs from the second component illustrated in FIG. 2 only in that the resistive layer 4 is replaced by a decorative layer 10 as described above.

Figure 5:
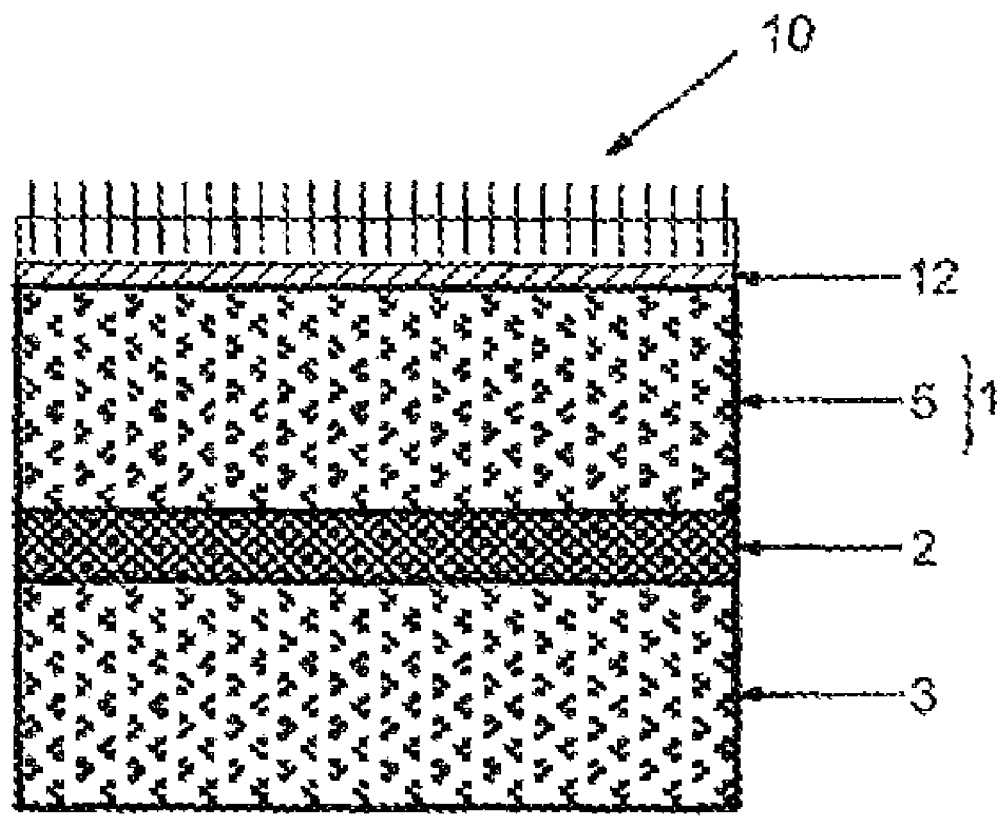
FIG. 5 is a view similar to FIG. 1 of a fifth sound-proofing component according to the invention capable of being applied to a floor of a motor vehicle.

A fifth moulded sound-proofing component which is intended to be provided on a metal sheet of a motor vehicle floor in order to form a matting is illustrated in FIG. 5.

That component differs from the fourth component illustrated in FIG. 4 only in that an intermediate, fine fluid-tight film 12 is interposed between the decorative layer 10 as described above and the porous layer 5.

The fine intermediate film 12 has a thickness of less than 500 μm and is, for example, between 10 μm and 500 μm, advantageously of 50 μm. In that manner, it has a mass per unit area of between 10 g/m$^2$ and 200 g/m$^2$, advantageously of 50 g/m$^2$.

That film 12 is tight with respect to passage of air. It is produced, for example, on the basis of a single-layer thermoplastic polymer such as polyethylene, polypropylene, polyester or a co-polymer, polyethylene styrene). In a variant, the film 12 is produced on the basis of a multiple-layer thermoplastic polymer, for example, on the basis of polyethylene/polyamide, polyethylene/polyamide, polyethylene. Advantageously, the film 12 is a bi-layer film on the basis of polyamide/polyethylene.

The decorative layer 10 is applied to the film 12, which is applied to the porous layer 5. In the case of use of the component as a matting applied to the floor of the vehicle, the film 12 provides water-tightness in order to prevent water from being introduced into the porous layer 5.

Generally, the sound-proofing components according to the invention comprising a densified intermediate layer 2 which is fluid-tight as described above in combination with the porous base layer 3 have, in a surprising manner, excellent acoustic insulation which is far greater than that of the components of the bi-permeable type which are known from the prior art.

The addition of a resistive layer 4 as described above further improves significantly the acoustic absorption, and even the acoustic insulation of the assembly in a surprising manner.

By way of illustration, FIGS. 6 and 7 illustrate measurements of the index of reduction in dB and the coefficient of absorption in a diffuse field α as a function of the frequency F for a triple-layer component for a bulkhead according to the invention, as illustrated in FIG. 1, for a four-layer component for a bulkhead according to the invention, as illustrated in FIG. 2, and for a bi-permeable component from the prior art.

In those embodiments of the invention, the porous layer 1, 5 is produced on the basis of a felt having a mass per unit area of 1200 g/m$^2$ and a thickness of 7 mm. The second porous layer 3 is produced on the basis of a polyurethane foam having a thickness of 13 mm.

The intermediate layer 2 has a thickness of substantially 1.5 mm.

The component of the prior art has a porous layer of compressed felt having a density of 1800 g/m$^2$ and a thickness of 6 mm, adhesively bonded to a layer of polyurethane foam having a thickness of 16 mm.

With reference to FIGS. 6 and 7, the line 20 is the minimum specification expected by the manufacturer and the line 22 is the higher specification.

The line 24 corresponds to the bi-permeable assembly of the prior art and the lines 26, 28 correspond to the triple-layer component of FIG. 1 and the four-layer component of FIG. 2, respectively.

As can be seen in FIG. 6, the components according to the invention (lines 26, 28) have, in a surprising manner, acoustic insulation which is distinctly improved in relation to the component of the prior art (line 24), in particular in the range of frequencies greater than 1600 Hz, as well as better acoustic absorption, as illustrated in FIG. 7.

In addition, the provision of a resistive layer 4 (lines 28) further substantially improves the insulation from 400 Hz and significantly increases the absorption over the entire range of frequencies studied.

The invention claimed is:

1. A method for producing a moulded sound-proofing component comprising a first porous layer and a second porous layer having open cells with an intermediate layer that is practically air-tight provided therebetween, the method comprising:

providing the first porous layer having a shape provided by the sound-proofing component;

providing the intermediate layer on the first porous layer; and injecting a polymer foaming composition to form the second porous layer, wherein the providing the intermediate layer on the first porous layer and the injecting a polymer foaming composition are carried out simultaneously in a single injection step of the polymer foaming composition to contact the first layer during formation of a polymer composition from the polymer foaming composition and the material of the first layer, and the intermediate layer being denser than each of the first and second porous layers, wherein the providing the first layer includes providing a layer of a porous material, the porous material being selected from a felt and a foam layer, and the first porous layer consists of one porous layer having a resistance to passage of air of between 200 $N·m^{-3}·s$ and 3500 $N·m^{-3}·s$, and wherein a density of the intermediate layer is lower the 666 $kg/m^3$.

2. The method according to claim 1, wherein the thickness of the intermediate layer after injection is between 10% and 20% of the thickness of the first porous layer.

3. The method according to claim 1, wherein the intermediate layer has a mass per unit area of between 100 $g/m^2$ and 1000 $g/m^2$.

4. The method according to claim 1, wherein the intermediate layer and the second porous layer are produced in such a manner that the polymer foaming composition injected in order to form the second porous layer penetrates into the porous structure of the first porous layer.

5. A moulded sound-proofing component produced by the method according to claim 1, wherein the intermediate layer is constituted only by the materials of the first and second porous layers.

6. The sound-proofing component according to claim 5, wherein the thickness of the intermediate layer is between 10% and 20% of the thickness of the first porous layer.

7. The sound-proofing component according to claim 5, wherein the intermediate layer has a mass per unit area of between 100 $g/m^2$ and 1000 $g/m^2$.

8. The sound-proofing component according to claim 5, wherein the first porous layer is provided with a porous layer whose external surface carries an additional layer having greater resistance to passage of air.

9. The sound-proofing component according to claim 8, wherein the additional layer having the greater resistance to passage of air has a resistance to passage of air of between 200 $N·m^{-3}·s$ and 2000 $N·m^{-3}·s$.

10. The sound-proofing component according to claim 5, further comprising a decorative matting layer provided on the first porous layer with a fine fluid-tight film being interposed therebetween.

11. The method according to claim 1, wherein the porous material of the first layer is provided with a porous layer whose external surface carries an additional layer having greater resistance to passage of air, and the step of providing the first layer comprises the positioning of the first layer of the porous material in such a manner that the additional layer having the greater resistance to passage of air is positioned at an exterior of the moulded sound-proofing component.

12. The sound-proofing component according to claim 6, wherein the intermediate layer has a mass per unit area of between 100 $g/m^2$ and 1000 $g/m^2$.

13. A method for producing a moulded sound-proofing component comprising a first porous layer and a second porous layer having open cells with an intermediate layer that is practically air-tight provided therebetween, the method comprising:

providing the first porous layer having a shape provided by the sound-proofing component;

providing the intermediate layer on the first porous layer; and injecting a polymer foaming composition to form the second porous layer, wherein the providing the intermediate layer on the first porous layer and the injecting a polymer foaming composition are carried out simultaneously in a single injection step of the polymer foaming composition contacting the first layer during formation of a polymer composition from the polymer foaming composition and the material of the first layer, and the intermediate layer being denser than each of the first and second porous layers, wherein the providing the first layer includes providing a layer of a porous material, the porous material being selected from a felt and a foam layer, wherein the porous material of the first layer is provided with a porous layer whose external surface carries an additional layer having greater resistance to passage of air, and the step of providing the first layer includes the providing of the layer of the porous material in such a manner that the additional layer having the greater resistance to passage of air is positioned at an exterior of the moulded sound-proofing component, wherein the additional layer having the greater resistance to passage of air has a resistance to passage of air of between 200 $N·m^{-3}·s$ and 2000 $N·m^{-3}·s$, and wherein a density of the intermediate layer is lower the 666 $kg/m^3$.

14. The method according to claim 13, wherein the intermediate layer has a mass per unit area of between 100 $g/m^2$ and 1000 $g/m^2$.

15. The method according to claim 13, wherein the intermediate layer and the second porous layer are produced in such a manner that the polymer foaming composition injected in order to form the second porous layer penetrates into the porous structure of the first porous layer.

16. A moulded sound-proofing component produced by the method according to claim 13, wherein the intermediate layer is constituted only by the materials of the first and second porous layers.

17. The sound-proofing component according to claim 16, wherein the thickness of the intermediate layer is between 10% and 20% of the thickness of the first porous layer.

18. The sound-proofing component according to claim 16, wherein the intermediate layer has a mass per unit area of between 100 $g/m^2$ and 1000 $g/m^2$.

19. The sound-proofing component according to claim 16, further comprising a decorative matting layer provided on the first porous layer with a fine fluid-tight film being interposed therebetween.

20. A method for producing a moulded sound-proofing component comprising a first porous layer and a second porous layer having open cells with an intermediate layer that is practically air-tight provided therebetween, the method comprising:

providing the first porous layer having a shape provided by the sound-proofing component;

providing the intermediate layer on the first porous layer; and injecting a polymer foaming composition to form the second porous layer, wherein the providing the intermediate layer on the first porous layer and the injecting a polymer foaming composition are carried out simultaneously in a single injection step of the polymer foaming composition to contact the first layer during formation of a polymer composition from the polymer foaming composition and the material of the first layer, and the intermediate layer being denser than each of the first and second porous layers, wherein the providing the first layer includes providing a layer of a porous material, the porous material being selected from a felt and a foam layer, and the first porous layer consists of one porous layer having a resistance to passage of air of between 200 N·m$^{-3}$·s and 3500 N·m$^{-3}$·s, wherein a density of the intermediate layer is lower the 666 kg/m$^3$, and wherein the resulting moulded sound-proofing component comprising the first porous layer and the second porous layer having open cells with the intermediate layer that is practically air-tight provided therebetween is configured as one of a motor vehicle floor sound-proofing component and a motor vehicle bulkhead sound-proofing component.

* * * * *